Figures 1, 2:
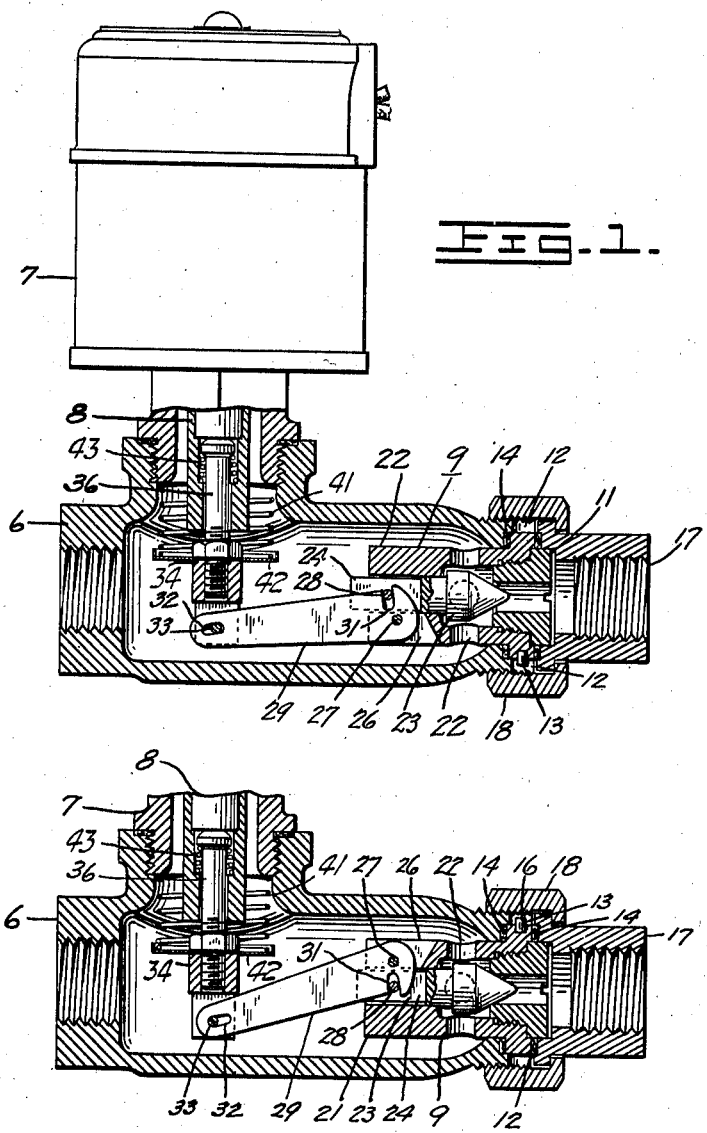

Aug. 25, 1936.  W. A. RAY  2,052,246

PLUNGER VALVE

Filed June 10, 1935

INVENTOR.
WILLIAM A. RAY.
BY Robert N. Eckhoff
ATTORNEY.

Patented Aug. 25, 1936

2,052,246

UNITED STATES PATENT OFFICE 2,052,246

PLUNGER VALVE

William A. Ray, San Francisco, Calif., assignor to General Controls Company, a corporation of California Application June 10, 1935, Serial No. 25,778

7 Claims. (Cl. 251—41)

This invention relates to a plunger type valve, particularly one in which the plunger is operated by a solenoid. The valve of the present invention is a commercially accepted structure, one that has met with success in many lines including refrigeration, steam and oil. As the power means for operating the valve I prefer to use a solenoid and the present valve has been very successful in this combination.

Utilization of a solenoid as the power means gives rise to special problems. For example, to make a commercially acceptable unit one cannot use a large size solenoid and the power available is therefore restricted. Since the valve must operate against a pressure of some magnitude, 100 pounds and higher, this is a real problem.

In refrigeration and steam valves, aside from the power requirement, a very serious problem is encountered in wire drawing resulting in leakage through the valve. In the valve of the present invention this has been largely eliminated.

It is an object of the present invention to provide a new and an improved plunger valve.

Another object is to provide a solenoid operated plunger valve useful on fluids under pressure.

A further object is to provide a plunger valve useful under a variety of conditions.

The invention possesses other advantageous features and objects some of which, together with the foregoing, will appear hereinafter wherein I have set forth a present preferred form of my plunger valve.

In the drawing Figures 1 and 2 illustrate preferred valve constructions, the views being partly in section.

In the form set forth as that now preferred, as required by statute but to which I do not limit myself for the invention can have various mechanical embodiments, I provide a valve body 6. Upon said body I mount a power unit as a solenoid 7 which includes a plunger 8. To control fluid flow through the valve I mount a valve supporting member 9 in the body. This member is adapted to receive a valve seat 11 shown as a separate element screwed into the valve supporting member 9 for construction purposes. The valve supporting member is tubular in section, slipping into the body 6 in either of the positions shown in Figures 1 and 2. The body includes a slot 12 to receive a pin 13 on member 9, the pin retaining the member in place. Gaskets 14 are placed between the valve body and valve supporting member shoulder 16 and between the shoulder and fitting 17, and coupling 18 is employed to draw the body and the fitting 17 together with the shoulder on the member 9 between.

The member 9 includes a tubular portion 21 with passages 22 therein for fluid flow. A valve member 23, for seating on the seat and slidable axially toward and away from the seat, is provided in the member 9. The member 23 includes a slot 24 thereon parallel to a slot 26 in member 9.

Means are provided for moving the valve member 23. In the simple form shown this means includes pin 27 on member 9, pin 28 on valve member 23 and lever 29. The lever is hinged on pin 27 and has a slot 31 for pin 28, the lever rotating about pin 27 and causing the valve member to slide axially. The other end of the lever includes a slot 32 for a pin 33 on a U member 34 which is adjustably carried on threaded rod 36 fitting into plunger 8. To permit use of a solenoid of small size and to ensure positive operation, considerable end play is permitted between rod 36 and the plunger. When the plunger lifts, it does not pick up rod 36 until it has moved some distance and has acquired momentum, thus ensuring positive operation of lever 29.

In the valve shown in Figure 1, current failure results in an open valve while the reverse is true of the arrangement in Figure 2. It is to be noted that the leverage arrangement is such that considerable force can be exerted on the valve elements so they operate successfully even against high pressure.

The solenoid, as is disclosed in my aforesaid application, includes a plunger 8 which is located in its raised position in a very definite manner so that it is quiet even on an A. C. supply. To ensure that the valve operates when the current fails I include spring 41 between body 6 and and cup washer 42 carried on rod 36 against U member 34. This spring ensures that the plunger drops when current fails.

In Figure 1 I have shown a spring 43 on rod 36 and within plunger 8. This spring ensures that the valve member seats positively even though the actuator therefor is moving at 90° to its direction of travel and even though said actuator (plunger 8) is of the type that seats as definitely as the valve member.

I claim:

1. In a valve, a valve body having an inlet and an outlet, a solenoid mounted on said body and including a movable plunger, a valve seat member positioned in said body, means adapted to retain said member in either of two selected positions, a valve member slidable toward and away from said seat, and a lever hinged to said valve member at one end, at its other end to said movable plunger and at an intermediate point on said valve seat member.

2. In a device of the character described, a valve body, a valve seat, a valve member slidable axially toward and away from said valve seat, a support in said body for said slidable member, means for positioning said support in said body in one of two selected positions, and means for sliding said member including a lever member supported within said body for a limited oscillatory movement on said support, said lever member having a cam connection with said slidable member at one end thereof, and a solenoid positioned on said body for moving the other end of said lever in said body in both positions of such support.

3. In a device of the character described, a valve body having an inlet and an outlet, a valve seat between said inlet and outlet, a valve member movable axially toward or away from said seat, a support for said valve member, means for positioning said support in said body in either of two selected positions, a solenoid mounted on said body and having a plunger movable between an extreme depending position with respect to said solenoid and an extreme raised position, and a lever mounted on said support for sliding said valve member and engageable with said plunger in both positions of said support to provide a valve in which the valve member is away from said seat or is in engagement with said seat for a single selected extreme plunger position.

4. In combination, a solenoid including a plunger movable between two extreme positions, a valve body into which said plunger depends and upon which said solenoid is mounted, a valve unit including a seat, a valve member engageable with said seat for controlling flow through said body, means connecting said plunger and said valve member including a lever, and means for positioning said unit in either of two selected positions to provide a valve in which for a given extreme position of said solenoid said valve member is selectively against or away from said seat.

5. In combination, a solenoid including a plunger movable between two extreme positions, a valve body into which said plunger depends and upon which said solenoid is mounted, a valve unit including a member carrying a valve seat, a valve member slidable toward or away from said seat, means for mounting said valve unit on said body in a first position or a second position, and a lever hinged to said valve seat carrying member and said valve member and extending to engage said plunger, said lever in said first position holding said valve member off said seat for a given plunger position and in said second position holding said valve member against said seat for said given plunger position.

6. In a valve, a valve body, an actuating member in said body and movable therein between two extreme positions, a valve seat in said body, a valve member movable toward and away from said seat, a support member positioned in said body, means adapted to retain said support member in either of two selected positions in said body, a bell crank carried by said support, and means for engaging said bell crank with said valve member and said actuating member in either position of said support member.

7. In a valve, a valve body, an actuating member in said body and movable therein between two extreme positions, a valve seat in said body, a valve member movable toward and away from said seat, a support member positioned in said body, means adapted to retain said support member in either of two selected positions 180° apart in said body, a bell crank carried by said support, and means for engaging said bell crank with said valve member and said actuating member in either position of said support member.

WILLIAM A. RAY.